United States Patent [19]
Lai

[11] Patent Number: 5,447,210
[45] Date of Patent: Sep. 5, 1995

[54] CAR-PARKING AND ROTATING MECHANISM

[76] Inventor: Kuo J. Lai, No. 35, Foo Chuan Ts'un, Min Hsiung Hsiang, Chiayi Hsien, Taiwan

[21] Appl. No.: 229,711

[22] Filed: Apr. 19, 1994

[51] Int. Cl.6 .............................................. B60S 9/215
[52] U.S. Cl. ................................................... 180/202
[58] Field of Search ................ 180/202, 200, 201, 199

[56] References Cited

U.S. PATENT DOCUMENTS

| | | | |
|---|---|---|---|
| 2,833,359 | 5/1958 | Allen | 180/202 |
| 3,003,571 | 10/1961 | Ash et al. | 180/202 |
| 3,826,322 | 7/1974 | Williams | 180/202 |
| 4,834,206 | 5/1989 | Ching-Tang | 180/202 |
| 4,998,595 | 3/1991 | Yeh | 180/202 |

FOREIGN PATENT DOCUMENTS

| | | | |
|---|---|---|---|
| 217303 | 1/1958 | Australia | 180/202 |
| 1040916 | 10/1958 | Germany | 180/201 |

Primary Examiner—Brian L. Johnson
Assistant Examiner—Kevin Hurley
Attorney, Agent, or Firm—Browdy and Neimark

[57] ABSTRACT

A car-parking and rotating mechanism including a controlling unit, four retrieving cylinders, four lifting cylinders and four transmisssion units each of which includes a two-way motor and a driven wheel. The controlling unit includes a controlling panel and an electric oil pump connected to a car battery serving as a power supply. The retrieving cylinder, lifting cylinder and transmission unit are disposed under a chassis of the car, whereby the controlling panel is selectively operated to control the movements of the four retrieving cylinders and lifting cylinders so as to lift the car on one side or all sides and the two-way motors of the transmission unit is controlled by the controlling panel to rotate clockwise or counterclockwise for driving the driven wheel so as to transversely move the car left or right into a parking site or rotate the car.

3 Claims, 7 Drawing Sheets

CAR-PARKING AND ROTATING MECHANISM

BACKGROUND OF THE INVENTION

The present invention relates to a car-parking and rotating mechanism which is able to transversely move the car left or right into a parking site or rotate the car clockwise or counterclockwise.

A conventional car is unable to move transversely or rotate about its own center. Therefore, the car cannot be parked into an insufficiently large parking site or cannot turn about in a narrow lane. This causes great inconvenience when a driver needs a parking site or must turn about in a narrow lane.

For solving the above problem, it is necessary to provide a car-parking and rotating mechanism which is able to transversely move the car left and right and rotate the car.

SUMMARY OF THE INVENTION

It is a primary object of the present invention to provide a car-parking and rotating mechanism including a controlling unit, four foldable retrieving cylinders, four lifting cylinders and four transmisssion units each of which includes a two-way motor and a driven wheel. When parking a car, the controlling unit controls the retrieving cylinders to push out the lifting cylinders and transmission units to contact the ground and lift up the car. The driven wheels of the transmission units are then driven clockwise or counterclockwise so as to transversely move the car left or right into a parking site.

It is a further object of the present invention to provide the above mechanism, wherein the two-way motors of the transmission units includes a pair of front two-way motors and a pair of rear two-way motors, whereby after the car is lifted up away from the ground, the controlling unit is able to control and make the two pairs of motors rotate clockwise and counterclockwise respectively to rotate the car about its own center.

It is still a further object of the present invention to provide the above mechanism, wherein when not used, the retrieving cylinder is able to retrieve the lifting cylinder into a horizontal position under the car chassis so as to prevent the lifting cylinder from damage due to rouge road surface. A protecting cover is further disposed beside the lifting cylinder for protecting the lifting cylinder and transmission unit from being struck by an external article.

It is still a further object of the present invention to provide the above mechanism, wherein the controlling unit independently controls the four lifting cylinders so that the car can be totally lifted up or lifted up only on one single side.

The present invention can be best understood through the following description and accompanying drawing, wherein:

DETAILED DESCRIPTION OF THE PREFERRED EMBODIMENT

Figure 1:
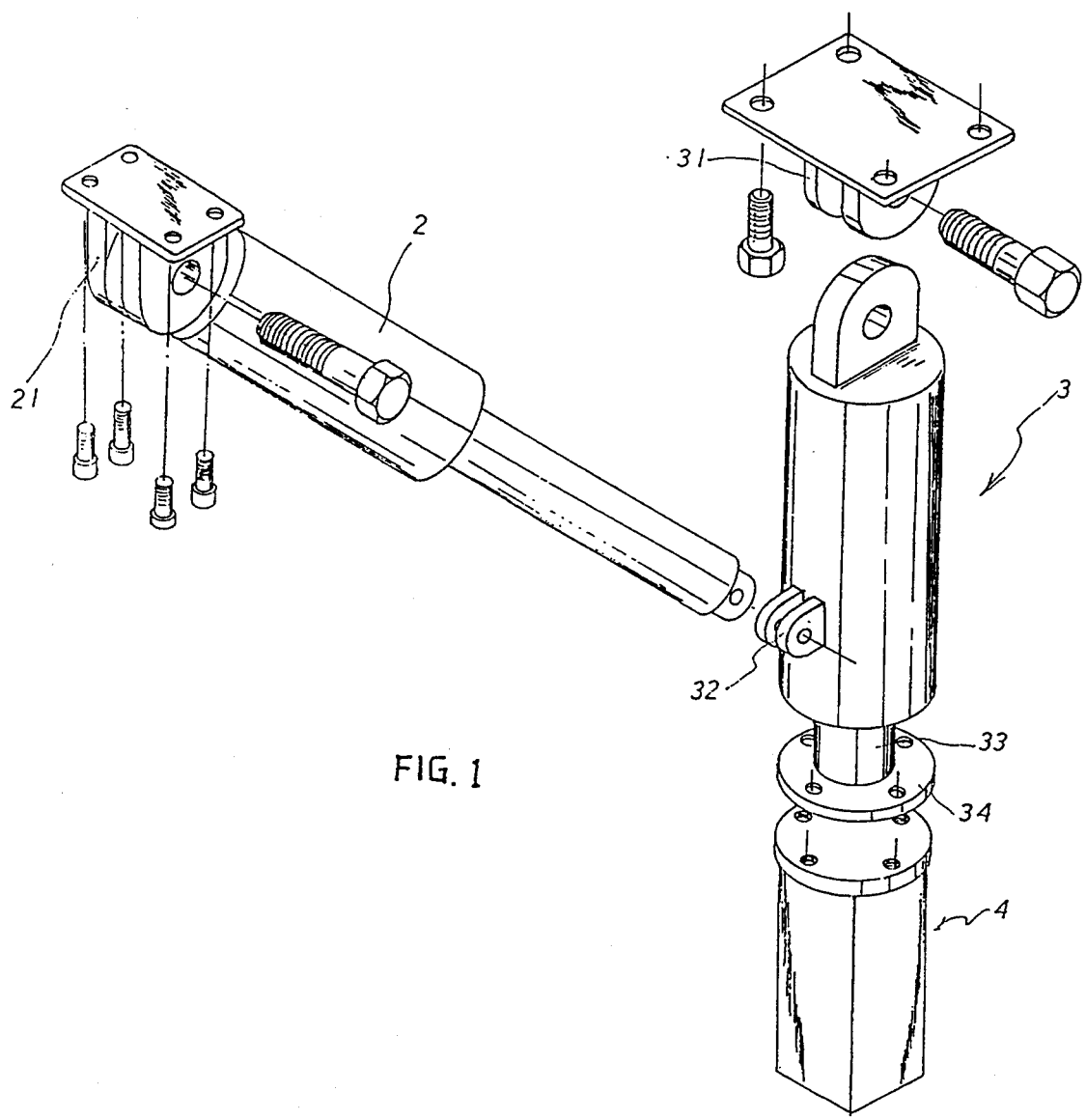
FIG. 1 is a perspective exploded view of the present invention.

Please refer to FIGS. 1 to 6. The car-parking and rotating mechanism of the present invention includes a controlling unit 1, four retrieving cylinders 2, four lifting cylinder 3 and four transmisssion units 4 each of which includes a two-way motor 41 and a driven wheel 42.

Figure 2:
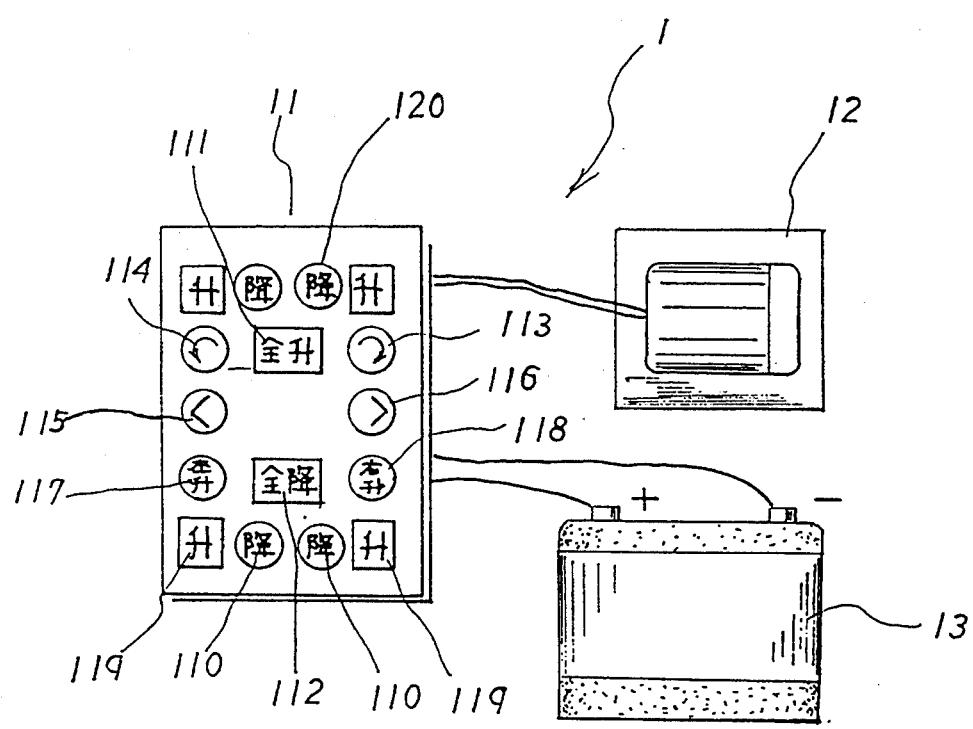
FIG. 2 shows the controlling unit of the present invention.

The controlling unit 1 includes a controlling panel 11 and an electric oil pump 12 connected to a car battery 13. The controlling panel 11 has multiple keys to actuate total ascending 111, total descending 112, right side rotation 113, left side rotation 114, right moving 115, left moving 116, left side ascending/descending 117, right side ascending/descending 118, sole ascending 119, sole descending 110 and power supply 120. The keys of total ascending 111, total descending 112, right side ascending/descending 118, left side ascending/descending 117, sole ascending 119 and sole descending 110 are connected to the oil pump 12 by respective circuits for controlling the movements of the retrieving cylinder 2 and the lifting cylinder 3. The keys of left side rotation 114, right side rotation 113, left moving 116 and right moving 115 are connected to the two-way motor 41 of the transmission unit 4 by respective circuits for driving the driven wheel 42 clockwise or counterclockwise (as shown in FIG. 2).

The retrieving cylinder 2 is pivotally connected to a first lug seat 21 which is fixed in a recess of a chassis 5 of the car. The retrieving cylinder 2 is connected to the electric oil pump 12, whereby by means of operating the controlling panel 11, the oil pump 12 can drive the retrieving cylinder 2.

The lifting cylinder 3 has a top end pivotally connected to a second lug seat 31 which is fixed on an inner side of a wheel 6. The lifting cylinder 3 is equipped with a third lug seat 32 at a middle portion thereof, whereby the retrieving cylinder 2 is pivotally connected to the third lug seat 32. The lifting cylinder 3 has a piston stem 33 at an end of which a fixing plate 34 is secured. The transmission mechanism 4 is fixed on the fixing plate 34 by screws. A protecting cover 7 is disposed beside the lifting cylinder 3 and transmission unit 4.

Figure 3:
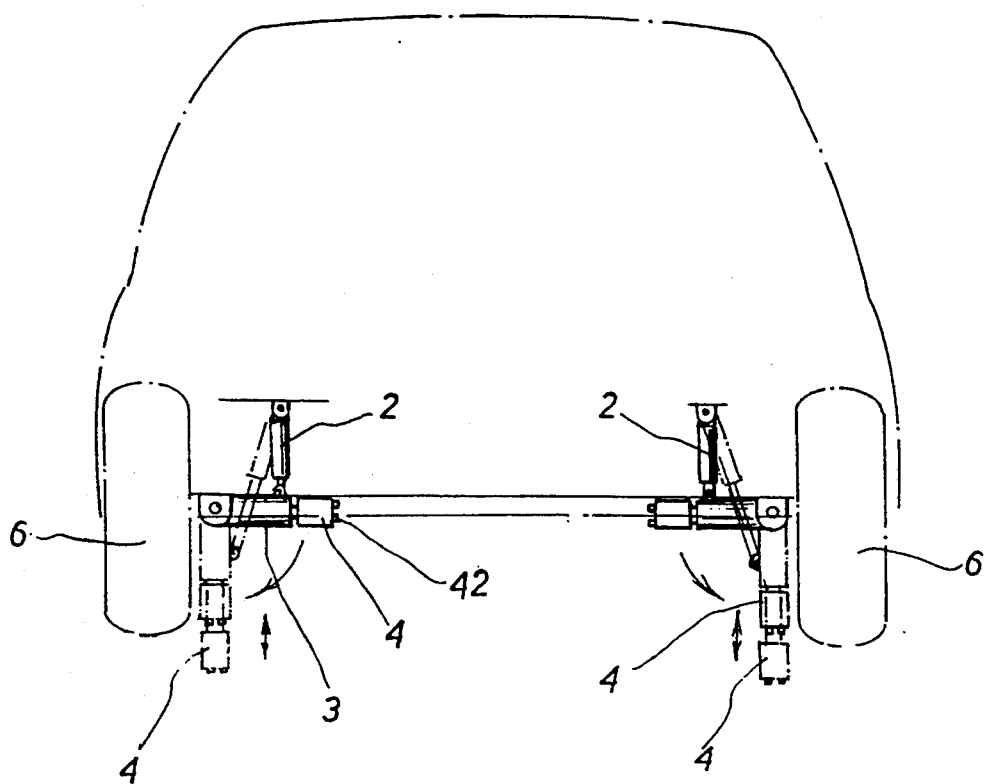
FIG. 3 shows the installation of the present invention under a car.
Figure 4:
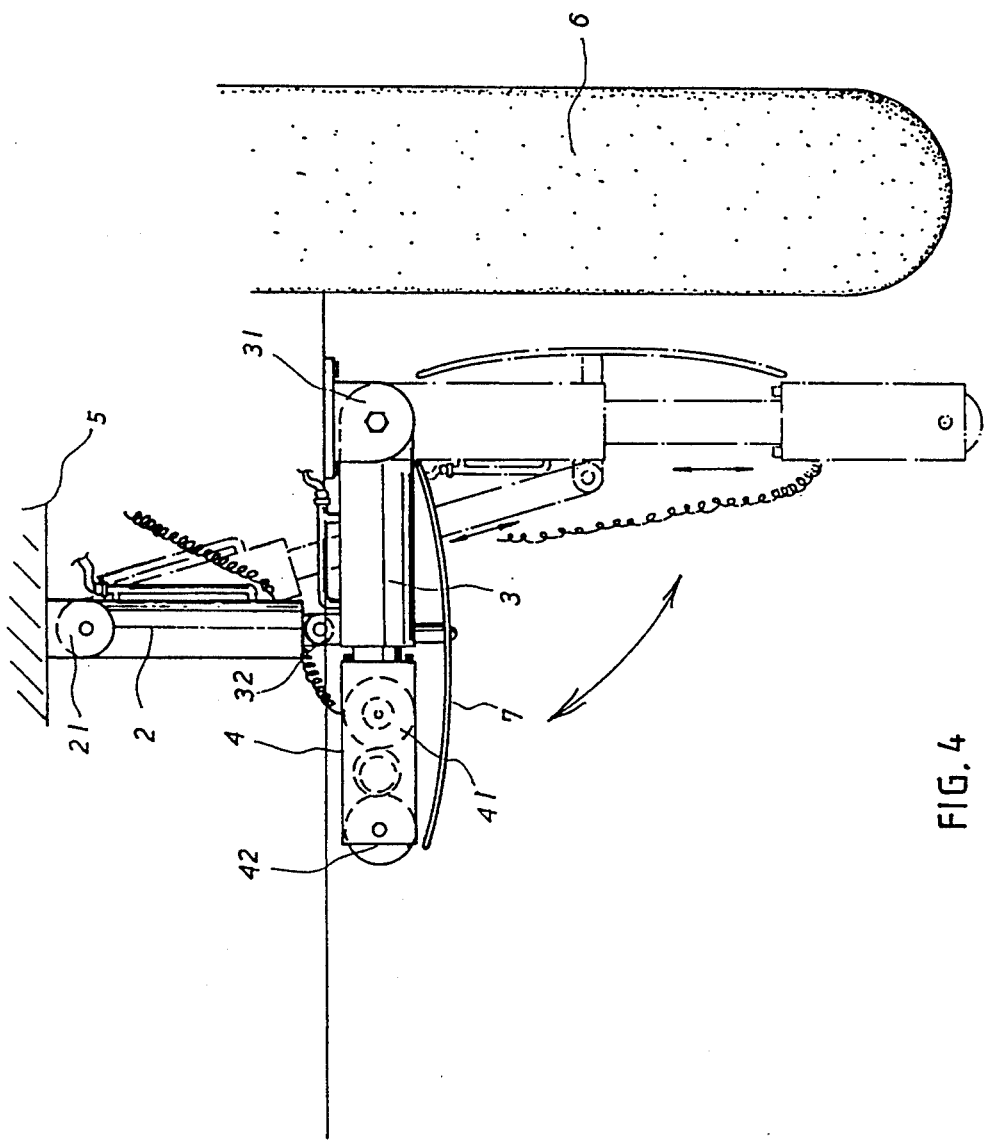
FIG. 4 shows the operation of the present invention.
Figure 5:
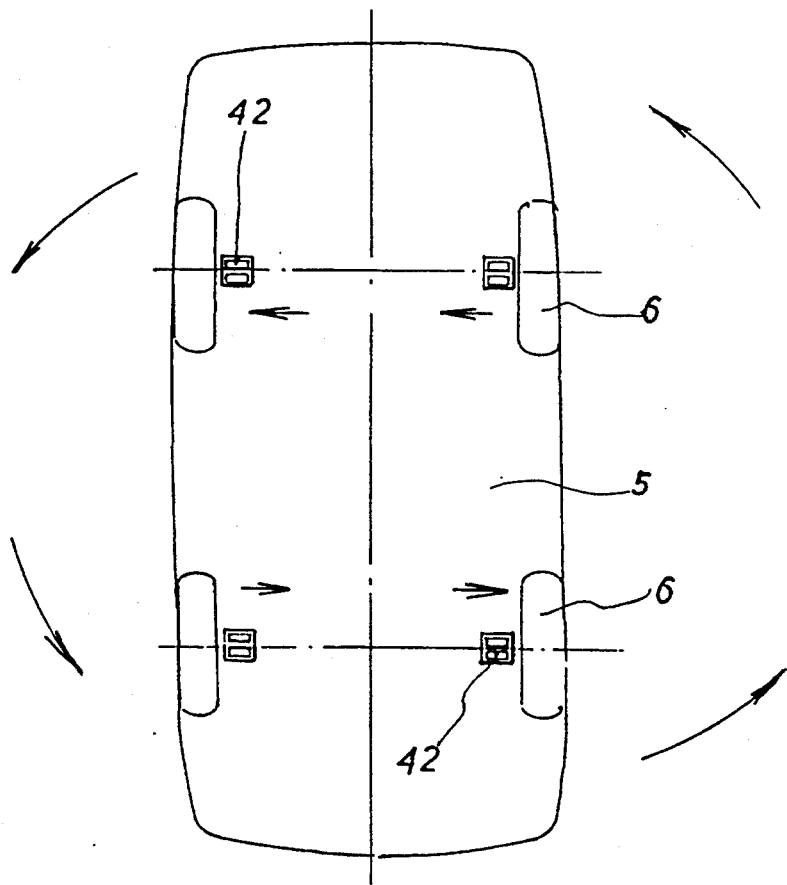
FIG. 5 shows the rotation of the car by means of the present invention.
Figure 6:
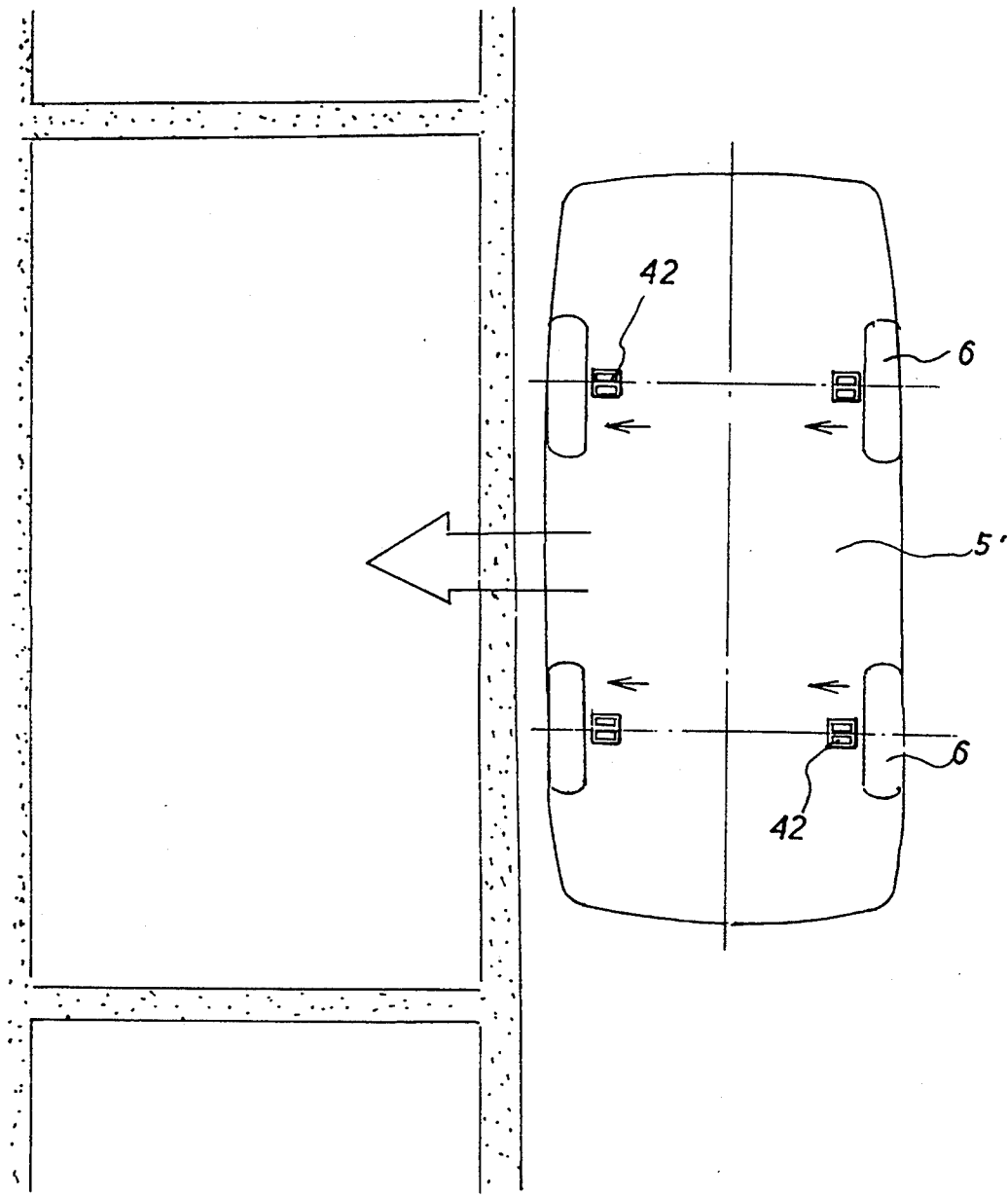
FIG. 6 shows the transverse movement of the car by means of the present invention.
Figure 7:
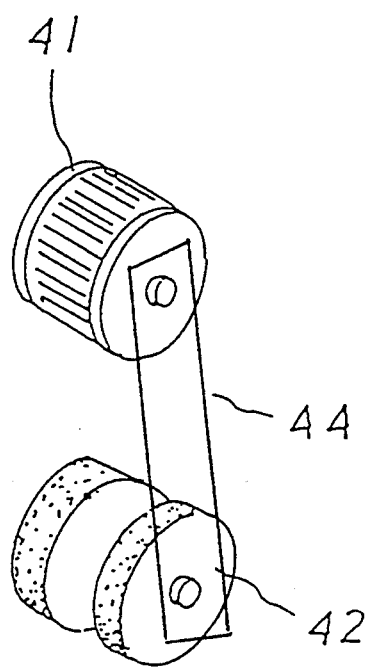
FIG. 7 shows a gear set schematically for use in another embodiment of the present invention.

The two-way motor 41 of the transmission unit 4 is controlled by the controlling panel 11 to rotate clockwise or counterclockwise for driving the driven wheel 42 through a chain 43 (as shown in FIGS. 3, 4, 5 and 6) or a conventional gear set 44 (as shown in FIG. 7). As shown in FIG. 3, and according to the above arrangements, after pressing down the power supply key 120 and the total ascending key 111, the electric oil pump 12 is activated to push out the lifting cylinder 3. When the lifting cylinder 3 becomes perpendicular to the car chassis 5, the lift cylinder 3 touches and pushes the ground and thus lifts up the car, making the wheels 6 thereof leave the ground. Meanwhile, the driven wheel 42 contacts the ground and the keys of left side rotation 114, right side rotation 113, left moving 116, right moving 115 can be selected. When it is desired to transversely park the car, the keys of the controlling panel 11 are selected to make all the two-way motors 41 simultaneously clockwise or counterclockwise rotate so as to transversely move the car left or right into a parking site. When it is desired to rotate the car, a pair of front two-way motors and a pair of rear two-way motors are rotated clockwise and counterclockwise respectively so that the car will rotate clockwise or counterclockwise at the same place. The retrieving cylinders 2 and lifting cylinders 3 of the present invention are independently controlled by the controlling panel 11 so that the car can be lifted on one single side or on all sides.

It is to be understood that the above description and drawings are only used for illustrating one embodiment of the present invention, not intended to limit the scope thereof. Any variation and derivation from the above description and drawings should be included in the scope of the present invention.

What is claimed is:

1. A car-parking and rotating mechanism engaged to a car comprising, a controlling unit, four retrieving cylinders, four lifting cylinders and four transmission units each of which includes a two-way motor and a driven wheel, wherein said controlling unit includes a controlling panel and an electric oil pump connected to a battery of the car serving as a power supply, said controlling panel having multiple keys to actuate total ascending, total descending, right side rotation, left side rotation, right moving, left moving, left side ascending/descending, right side ascending/descending, sole ascending, sole descending and a power supply, said keys to actuate total ascending, total descending, right side ascending/descending, left side ascending/descending, sole ascending and sole descending being connected to said oil pump by respective circuits for controlling movements of said four retrieving cylinders and said four lifting cylinders, said keys to actuate left side rotation, right side rotation, left moving and right moving being respectively connected to each of said two-way motors of said transmission units by respective circuits for driving each said driven wheel clockwise or counterclockwise, each of said retrieving cylinders being respectively pivotally connected to a first lug seat which is fixed in a recess of a chassis of the car, each of said retrieving cylinders being connected to said electric oil pump, whereby by means of operating said controlling panel, said oil pump is able to drive each of said retrieving cylinders, each of said lifting cylinders having a top end pivotally connected to a second lug seat which is fixed on an inner side of a car wheel, each of said lifting cylinders being equipped with a third lug seat at a middle portion thereof, whereby each of said retrieving cylinders is pivotally connected to said third seat, each of said lifting cylinders having a piston stem at an end of which a fixing plate is secured, each of said transmission units being fixed on said fixing plate by screws, a protecting cover being disposed beside a corresponding lifting cylinder of said lifting cylinders and a corresponding transmission unit of said transmission units, said two-way motor of each of said transmission units being controlled by said controlling panel to rotate clockwise or counterclockwise for driving said driven wheel, whereby said controlling panel is selectively operated to activate said oil pump so as to drive said retrieving cylinders for pushing out a corresponding lifting cylinder of said lifting cylinders to become perpendicular to the car chassis and touch the ground and thus lift up the car, making the wheel thereof leave the ground and making said driven wheel contact the ground, and thereafter said controlling panel is further selectively operated to make some or all of each said two-way motor clockwise or counterclockwise rotate so as to transversely move the car left or right or rotate the car.

2. A car-parking and rotating mechanism as claimed in claim 1, wherein a chain is provided between said two-way motor and said driven wheel for driving said wheel.

3. A car-parking and rotating mechanism as claimed in claim 1 wherein a gear set is provided between said two-way motor and said driven wheel for driving said driven wheel.

* * * * *